G. D. PARKER.
FRUIT WEIGHER.
APPLICATION FILED SEPT. 27, 1907.
947,255.
Patented Jan. 25, 1910.
2 SHEETS—SHEET 1.
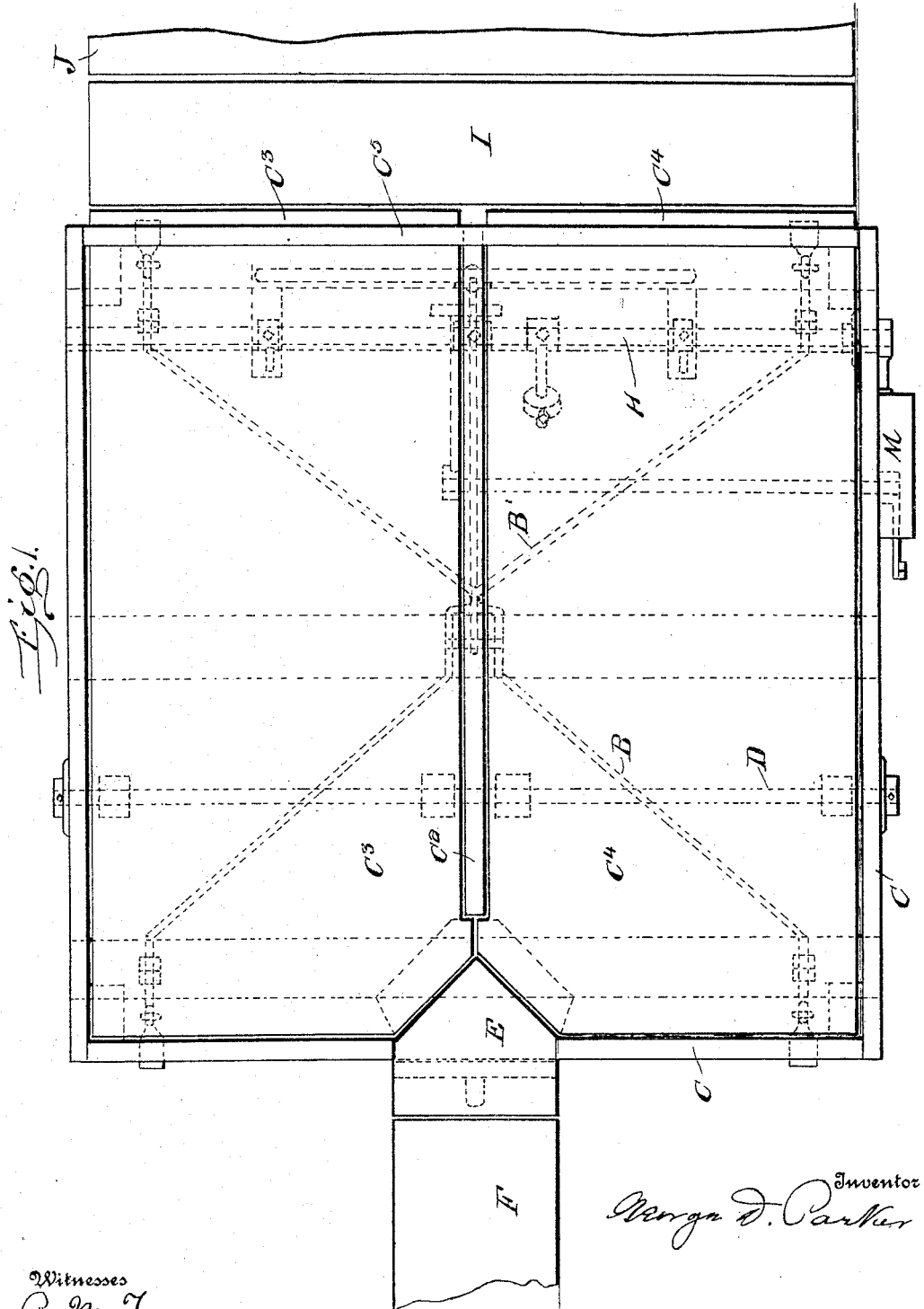

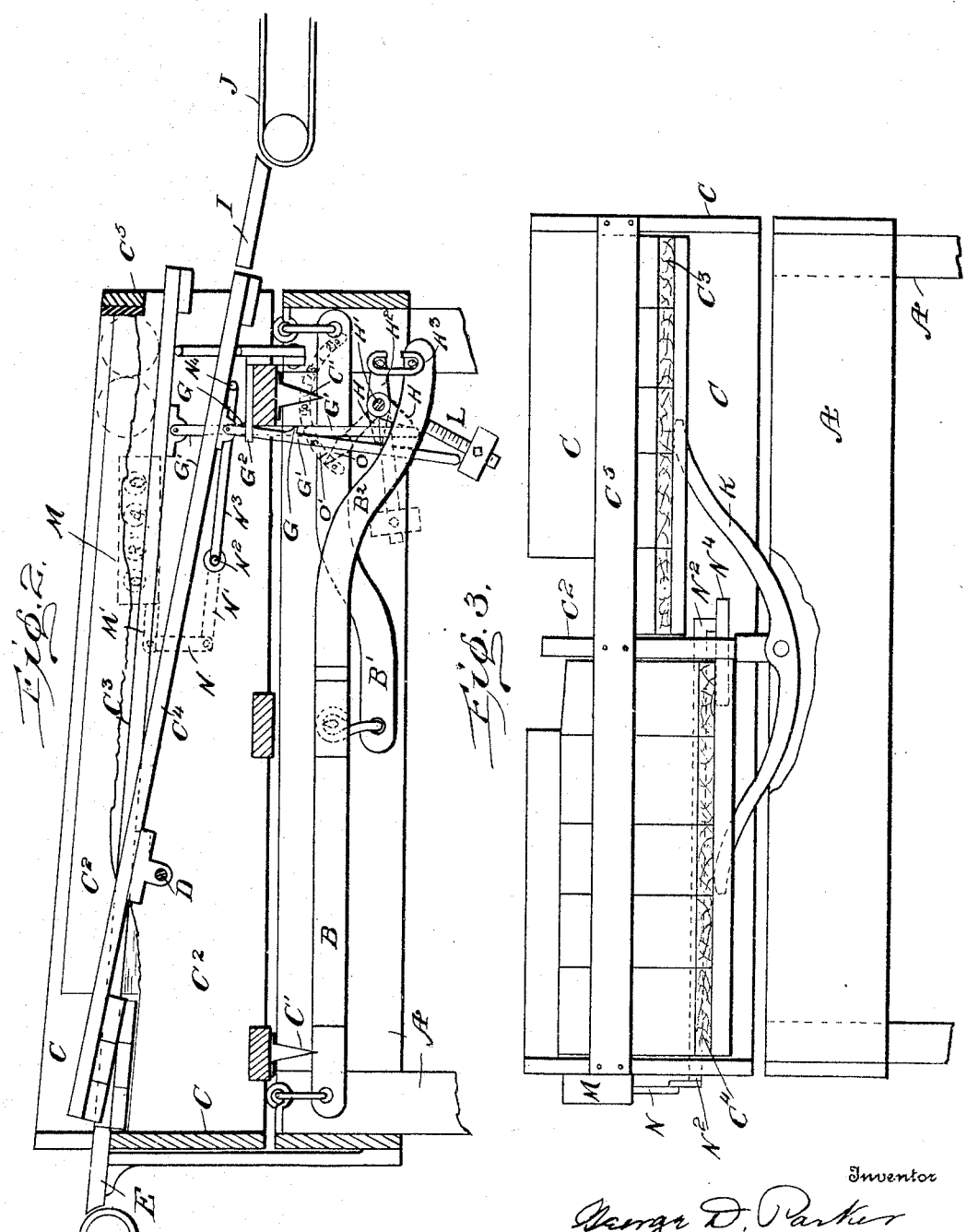

UNITED STATES PATENT OFFICE.

GEORGE D. PARKER, OF RIVERSIDE, CALIFORNIA.

FRUIT-WEIGHER.

947,255.  Specification of Letters Patent.  Patented Jan. 25, 1910.

Application filed September 27, 1907. Serial No. 394,817.

*To all whom it may concern:*

Be it known that I, GEORGE D. PARKER, a citizen of the United States, residing at Riverside, in the county of Riverside and State of California, have invented certain new and useful Improvements in Fruit-Weighers, of which the following is a specification, reference being had therein to the accompanying drawing.

Oranges are handled by associations which take the product of many groves, sort the fruit according to size, and separate it into lots of equal weight. It is desirable to handle the fruit rapidly without injuring it and to determine accurately the weight of residual lots that may be left in weighing by themselves the quantities furnished by many growers.

To provide an automatic machine capable of securing these results is the general object of this invention, and this object is attained by providing companion hoppers to receive alternately the fruit delivered constantly by a conveyer, each hopper discharging automatically as soon as it contains a predetermined weight or load, providing a register to record the number or aggregate weight of the loads, and also providing an indicator to show the weight of any partial, residual loads. The devices are such that the fruit is never allowed to fall nor conveyed or arrested in such manner that it may be injured.

In the accompanying drawings, Figure 1 is a plan view of the apparatus. Fig. 2 is a section on the line 2—2, Fig. 1. Fig. 3 is a view of the devices looking from the right in Figs. 1 and 2.

In these figures, A represents a fixed or stationary frame in which are mounted, as in ordinary platform scales, scale beams or levers B, B'. Above these levers is a hopper C, supported by knife edge members C' resting upon the scale levers and divided into two compartments by a longitudinal partition $C^2$. Each compartment is provided with an inclined, loosely fitting bottom $C^3$, $C^4$ pivoted to rock upon a transverse rod D mounted in the sides of the hopper. At the upper ends of the bottom members the end wall of the hopper is cut away to form a notch in which is secured an inclined shelf E having a pointed end the inclined edges of which lie, respectively, in close proximity to the obliquely cut corners of the two bottom members whenever those members are in position to receive their loads of fruit from this shelf upon which it is constantly delivered by a conveyer F at the same level. While one of the bottoms is slightly inclined and locked at rest in position to receive fruit, the other is much more inclined or tilted upon its axis, and therefore its end adjacent to the shelf is raised above the shelf so far as to prevent its receiving oranges therefrom. Under this condition all the fruit enters the other compartment and rolls down the gentle incline until it is arrested by a preferably padded bar $C^5$. This bottom is locked against tilting by a catch G upon a pendent bar G' hinged to the bottom, the catch engaging a plate $G^2$ provided with a slot through which the bar passes. When, however, the weight of the fruit accumulated in the hopper reaches a certain limit, the entire hopper descends slightly, the scale levers swinging on their supports, and this movement unlocks the locked bottom which, owing to the excess of fruit upon its lower end portion, immediately tilts so far that the oranges are discharged by rolling beneath the padded bar, over a shelf I at the level of the depressed end of the bottom, and thence to a conveyer J at the level of the lower side of the shelf. This tilting of the bottom raises its upper end above the shelf E temporarily cutting off the supply of oranges entering this compartment. In thus tilting, the lower end of the bottom presses down one end of a centrally pivoted lever K, the opposite end of which presses the bottom of the other compartment upward, tilting it into registry with the shelf E, so that fruit immediately begins to fill this compartment in turn.

The unlocking above mentioned is effected by means of a lug H upon a rock-shaft H' mounted in the frame A and rocked by means of an arm $H^2$ projecting from the shaft and connected to the free end portion $B^2$ of one of the scale levers. When the portion $B^2$ moves downward, the lug pushes the bar G' aside and disengages the catch G. As the inclination of the bottom from which the oranges are being discharged is much greater than that of the bottom upon which they are received in entering each load will be fully discharged before a material number have entered the other compartment, or in other words the hopper will momentarily be relieved of the weight that caused it to swing the scale levers. When so relieved it quickly rises to initial position, the lugs upon the rock-shaft swing and the catch upon the bar pendent from the rising bottom engages its plate and locks this bottom in turn. These movements take place rapidly, and are automatically repeated indefinitely.

It is to be understood that the scale and hopper devices are so balanced that the hoppers dump when the desired weight of fruit has entered the hopper, and this weight may be varied by adjusting a weight X upon an arm L fixed to the rock-shaft. The discharge movements of the bottoms are all recorded by a register M actuated by an arm M′, all without novelty. The arm M′ is actuated by a link N connected to an arm N′ upon a rock-shaft N² mounted upon the hopper below the paths of the tilting bottoms and provided also with a second arm N³ having at its free end a cross-bar N⁴ in position to be depressed sufficiently to actuate the register when either hopper tilts to discharging position. I also provide the rock-shaft H′ with an index arm O which sweeps over a suitable graduated scale O′ as the hopper descends and thereby indicates the exact weight in the hopper at any time, thereby giving the weight of any partial final load with which any grower should be credited.

What I claim is:

1. The combination with a hopper having a bottom arranged for tilting, upon a transverse horizontal axis unequally distant from two opposite margins, from normal to more inclined position, of a supply chute normally having its surface approximately continuous with the surface of the bottom when the latter is in non-tilted position, a second discharging chute at the opposite side of the bottom in position to form a similar continuation of the bottom when in tilted position, and means whereby a given weight of fruit automatically causes the bottom to tilt from normal to more inclined position.

2. The combination with pivoted scale levers, of a fruit hopper supported thereby and provided with a bottom arranged for tilting upon a transverse horizontal axis unequally distant from two opposite margins, a chute for delivering fruit without drop in an approximately horizontal direction upon the bottom when the latter is in normal position, a chute at the opposite side for similarly receiving fruit when the bottom is tilted, devices for locking the bottom against tilting, and mechanical means whereby movement of the scale levers under a predetermined weight releases the locking devices.

3. The combination with suitably mounted scale levers, of hopper devices supported thereon and having two compartments each with a bottom inclined to permit oranges to roll down the same automatically and arranged for tilting to greater obliquity upon a transverse axis between its ends, a chute discharging fruit in approximately horizontal direction upon said bottom when the latter is in non-tilted position, means for locking each bottom against tilting while fruit rolls down the same, and means whereby the descent of the scale levers releases one of the bottoms.

4. The combination with suitably supported scale levers, of a hopper supported thereon and divided into two compartments having normally inclined bottoms adapted to tilt independently upon axes nearest their upper sides, means for delivering fruit in an approximately horizontal stream upon said bottoms alternately, alternately acting means for locking the bottoms in normal position, means whereby the descent of the scale levers under a given weight of fruit on either bottom releases that bottom allowing it to dump or increase its inclination and discharge, and means whereby the discharging movement of one bottom restores the other to normal position.

5. The combination with a fruit delivery chute slightly inclined from horizontal position, of a hopper provided with a bottom normally forming a continuation of the chute and pivoted between its ends, a second lower chute at the opposite side of said bottom in position to form a continuation of said bottom when the latter is tilted, and a stop free from and near the lower end of the bottom in position to arrest fruit passing down the untilted bottom.

6. The combination with suitably supported scale levers and a hopper carried thereby and provided with two compartments having independent bottoms inclined in the same direction and pivoted to rock upon transverse axes unequally distant from the upper and lower ends thereof, of means for locking each bottom in normal position, means whereby the movement of said levers under a certain weight upon either bottom unlocks it, and means for at will varying the resistance of the unlocking devices to the action of the weight.

7. The combination with suitably mounted scale levers and a divided hopper frame supported thereby and cut away upon one side to receive fruit and cut away at a lower point upon the opposite side to discharge fruit, of distinct bottoms inclined in the same direction and pivoted in the compartments, respectively, in position to receive fruit at their upper sides and to discharge it when tilted, stops limiting the tilting of the bottoms, bars extending from the bottoms to engage said stops, respectively, a rock shaft provided with arms to push said bars out of engagement, means whereby descent of the scale levers actuates the rock shaft, and an arm and adjustable weight thereon to resist the rocking of the shaft.

8. The combination with the hopper divided into two compartments having inclined independently tilting bottoms, of a shelf at the upper side of the bottoms and in the plane in which each lies when in normal position, means for constantly advancing fruit upon said shelf, and means whereby the bottoms automatically tilt alternately upon an axis at some distance above their upper sides, thereby raising their upper sides alternately above the shelf and compelling the fruit to enter only one compartment at a time.

In testimony whereof I affix my signature in presence of two witnesses.

GEORGE D. PARKER.

Witnesses:
   THEO. D. HEWITT,
   W. M. KING.